United States Patent
Namou et al.

(10) Patent No.: US 10,432,005 B2
(45) Date of Patent: Oct. 1, 2019

(54) DISCHARGE CIRCUIT FOR DISCHARGING A BATTERY

(71) Applicant: GM GLOBAL TECHNOLOGY OPERATIONS LLC, Detroit, MI (US)

(72) Inventors: Andrew J. Namou, West Bloomfield, MI (US); Todd F. Mackintosh, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 355 days.

(21) Appl. No.: 15/181,048

(22) Filed: Jun. 13, 2016

(65) Prior Publication Data

US 2016/0285296 A1    Sep. 29, 2016

Related U.S. Application Data

(62) Division of application No. 13/545,748, filed on Jul. 10, 2012, now Pat. No. 9,428,058.

(51) Int. Cl.
```
H02J 7/00      (2006.01)
H01M 10/44     (2006.01)
B60L 3/00      (2019.01)
B60L 3/04      (2006.01)
B60L 50/61     (2019.01)
```
(Continued)

(52) U.S. Cl.
CPC .......... *H02J 7/0063* (2013.01); *B60L 3/0007* (2013.01); *B60L 3/0046* (2013.01); *B60L 3/04* (2013.01); *B60L 50/61* (2019.02); *B60L 50/66* (2019.02); *B60L 58/12* (2019.02); *B60L 58/21* (2019.02); *H01M 10/44* (2013.01); *H02J 7/0068* (2013.01); *H02J 7/0072* (2013.01);

*B60L 2240/547* (2013.01); *B60L 2270/00* (2013.01); *H01M 2220/20* (2013.01); *H02J 7/0029* (2013.01); *H02J 2007/0067* (2013.01); *Y02T 10/6217* (2013.01); *Y02T 10/7005* (2013.01); *Y02T 10/7011* (2013.01); *Y02T 10/7016* (2013.01); *Y02T 10/7044* (2013.01); *Y02T 10/7061* (2013.01); *Y02T 10/7077* (2013.01)

(58) Field of Classification Search
CPC .. H02J 7/00; H02J 7/04; H02J 7/0063; H01M 10/44; Y02T 10/7044; B60L 3/0007
USPC ................... 320/136, 163; 324/433
See application file for complete search history.

(56) References Cited

U.S. PATENT DOCUMENTS 5,610,511 A * 3/1997 Parker ............... G01R 19/16542
                                                 324/106
5,777,456 A * 7/1998 Kern ..................... H02J 7/0073
                                                 320/125

(Continued)

*Primary Examiner* — Edward Tso
*Assistant Examiner* — Aaron Piggush
(74) *Attorney, Agent, or Firm* — Cantor Colburn LLP

(57) ABSTRACT

A system and method for discharging a high voltage vehicle battery. The system includes a discharge circuit having a reference voltage source providing a reference voltage and a load for discharging the battery. A negative terminal of the voltage source is electrically coupled to a negative terminal of the battery so that upon initiation of the discharging sequence, the battery is discharged through the load to the reference voltage. The discharge circuit can be electrically configured so that the battery, the voltage source and the load are electrically coupled in series or the battery, the voltage source and the load are electrically coupled in parallel.

13 Claims, 7 Drawing Sheets

(51) Int. Cl.
   *B60L 58/12*   (2019.01)
   *B60L 58/21*   (2019.01)
   *B60L 50/60*   (2019.01)

(56) References Cited

U.S. PATENT DOCUMENTS

| | | |
|---|---|---|
| 7,427,865 B2 | 9/2008 | Elder et al. |
| 8,198,750 B2 | 6/2012 | Svensson et al. |
| 2011/0221370 A1 | 9/2011 | Fukuta et al. |
| 2013/0175999 A1 | 7/2013 | Thieme et al. |

\* cited by examiner

DISCHARGE CIRCUIT FOR DISCHARGING A BATTERY

CROSS-REFERENCE TO RELATED APPLICATIONS

This application is a Divisional application of U.S. patent application Ser. No. 13/545,748, titled, Externally Referenced Scalable Auto Discharge Method for Hybrid Electric Vehicles, filed Jul. 10, 2012.

BACKGROUND OF THE INVENTION

Field of the Invention

This invention relates generally to a system and method for discharging a high voltage battery and, more particularly, to a system and method for discharging a high voltage vehicle battery following a vehicle damaging event or other discharging circumstance by discharging the battery to an external reference source.

Discussion of the Related Art

Electric vehicles are becoming more and more prevalent. These vehicles include hybrid vehicles, such as the extended range electric vehicles (EREV), that combine a battery and a main power source, such as an internal combustion engine, fuel cell systems, etc., and electric only vehicles, such as the battery electric vehicles (BEV). These batteries can be different battery types, such as lithium-ion, nickel metal hydride, lead-acid, etc. A typical high voltage battery system for an electric vehicle may include several battery cells or modules to provide the vehicle power and energy requirements, where each battery module may include a certain number of battery cells, such as twelve cells. Different vehicle designs include different battery designs that employ various trade-offs and advantages for a particular application.

During a vehicle crash or other vehicle damaging event, the rearrangement of and/or damage to various vehicle parts and the like may cause unwanted electrical connections and the discharge of various fluids from the vehicle to occur. Because of the significant electrical power that may be stored in the vehicle battery, these things could cause potentially hazardous situations, such as electrifying of vehicle parts, chemical hazards, fire hazards, etc. Designs of vehicle battery systems need to consider these possibly harmful events.

Fault isolation detection systems are sometimes employed in electrical circuits to provide electrical fault detection. Electric vehicles are one electrical system that typically employ fault isolation detection systems to prevent a person from being harmed by high voltage on the vehicle.

In order to provide electrical fault isolation, some vehicles are equipped with a battery disconnect unit (BDU) that automatically disconnects or removes battery power from the vehicle after a crash or other event by opening battery contactors. Also, it is known in the art to employ a manual service disconnect (MSD), which is a device that separates a battery into two parts, where a trained responder responding to a vehicle crash could remove the MSD to isolate the battery. However, these known isolation techniques do not remove the charge from the battery, only contain it.

As mentioned, when a hybrid electric vehicle experiences a crash or other similar event, the integrity of the vehicle battery or other rechargeable energy storage system (RESS) always becomes a concern regardless of the degree of vehicle damage. It is desirable to discharge the battery during such an event, for example, reduce the battery voltage by half. Known battery discharge systems can be expensive, for example, thousands of dollars, and are typically heavy and require significant space. One known battery discharge system is a stand alone, embedded advanced monitoring system with DC/DC buck/boost converters including liquid cooled load banks and semi-advanced control systems. Also, compatibility between the various forms of energy storage devices in the market makes battery discharge a complicated task because of the various voltages, chemistries and current levels.

SUMMARY OF THE INVENTION

In accordance with the teachings of the present invention, a system and method are disclosed for discharging a high voltage vehicle battery. The system includes a discharge circuit having a reference voltage source providing a reference voltage and a load for discharging the battery. A negative terminal of the voltage source is electrically coupled to a negative terminal of the battery so that upon initiation of the discharging sequence, the battery is discharged through the load to the reference voltage. The discharge circuit can be electrically configured so that the battery, the voltage source and the load are electrically coupled in series or the battery, the voltage source and the load are electrically coupled in parallel.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for discharging a high voltage vehicle battery using an externally referenced voltage source is merely exemplary in nature, and is in no way intended to limit the invention or its applications or uses. For example, the battery discharge technique of the present invention has particular application for discharging a vehicle battery. However, as will be appreciated by those skilled in the art, the discharge technique of the invention may have application for other battery systems other than vehicle battery systems.

Figure 1:
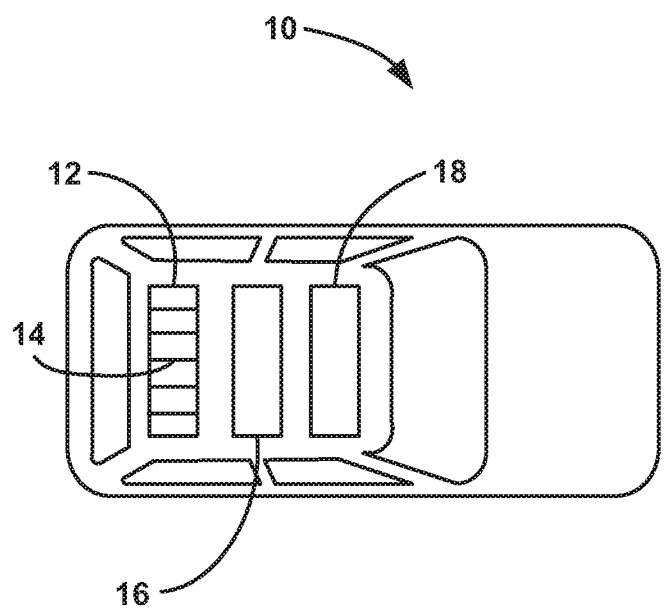
FIG. 1 is a simple illustration of a vehicle including a high voltage battery.

FIG. 1 is a simple illustration of a vehicle 10 intended to represent any electric vehicle or electric hybrid vehicle. The vehicle 10 includes a high voltage battery 12 mounted to a suitable support within the vehicle 10, where the battery 12 includes a plurality of battery cells 14. The battery 12 can be any battery suitable for an electric vehicle, such as a lead-acid battery, lithium-ion battery, nickel metal hydride battery, etc. The vehicle 10 may also include a separate power source 16, such as an internal combustion engine, fuel cell system, etc., for an electric hybrid vehicle. The vehicle 10 also includes an electronic control unit (ECU) 18 that controls various aspects of the operation of the vehicle 10.

As will be discussed detail below, the present invention proposes various auto-discharge circuits for discharging a vehicle battery when desired, such as after a crash event, or other vehicle damaging event, by the appropriate crash responder, such as a tow truck driver during service by an appropriate service person, by scrap yard personal, etc. In one embodiment, the circuit is part of a unit that the particular person will bring to the vehicle and electrical couple to the battery terminals using appropriate leads, such as jumper type cables. Each of the various circuits is relatively inexpensive and simple in architecture to allow it to be readily available to all interested parties.

Figure 2:
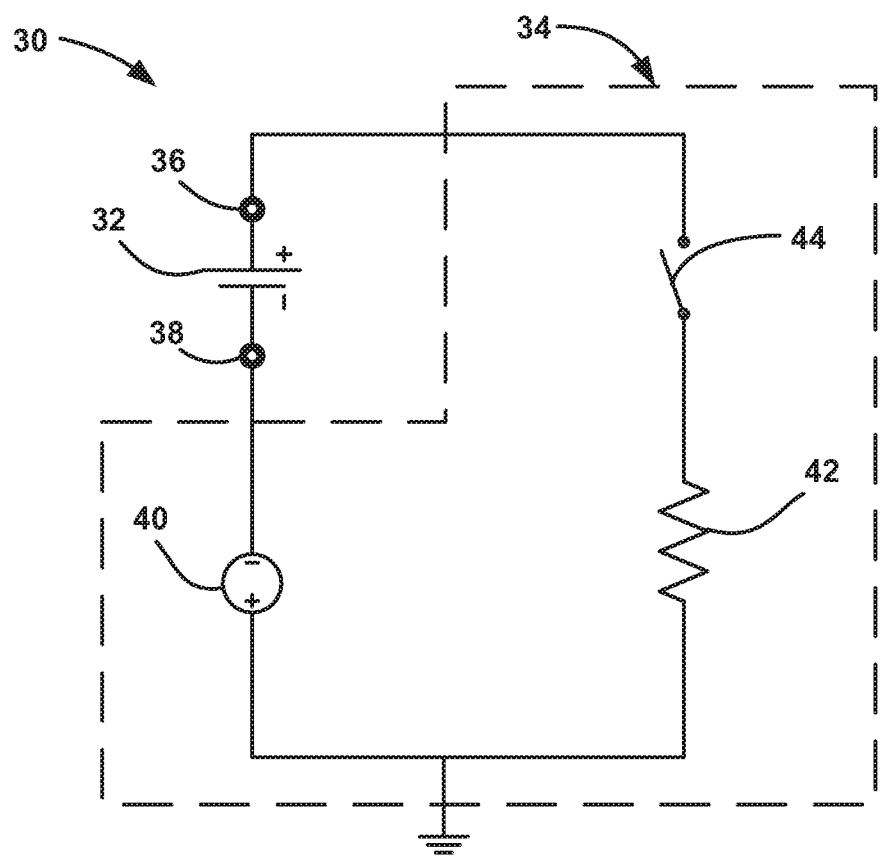
FIG. 2 is a schematic diagram of a series configured externally referenced scalable auto-discharge circuit.

FIG. 2 is a schematic diagram of an externally referenced, scalable auto-discharge circuit 30 for discharging a high voltage vehicle battery pack 32. As will be discussed in detail below, the circuit 30 provides an externally referenced discharge of the battery pack 32 using a series configured architecture. The circuit 30 is externally referenced because the reference voltage to which the battery pack 32 is discharged to is external to the vehicle. Further, the circuit 30 is scalable because that reference voltage is variable and can be changed. The circuit 30 is an auto-discharge circuit because once the circuit is connected and turned on, the battery pack 32 will automatically discharge to the reference voltage.

The circuit 30 includes a discharge unit 34 that is not part of the electric vehicle, such as a portable unit, where the unit 34 is connected to the battery pack 32 at terminals 36 and 38 when the situation or need arises for discharging the battery pack 32 consistent with the discussion herein. The discharge unit 34 includes a DC reference voltage source 40 that is electrically coupled in series with the battery pack 32 and provides a DC reference voltage to which the battery pack 32 is discharged to. In one embodiment, the DC voltage source 40 is a variable source and can be controlled by the operator to set the discharge reference voltage of the battery pack 32.

The battery pack 32 is discharged to the reference voltage provided by the source 40 through a load 42 that is electrically coupled in series with the source 40 and the battery pack 32. The load 42 can be any load suitable for the purposes discussed herein, such as a bank of resistors. The load 42 can have any resistance value or impedance suitable for the desired discharge time and the desired discharge rate for the battery pack 32 to be discharged to the DC reference voltage. That resistance value will set the size and weight of the load 42, which is a design concern. In this electrical configuration, the negative terminal 38 of the battery pack 32 is electrically coupled to the negative terminal of the voltage source 40 and the positive terminal 36 of the battery pack 32 is electrically coupled to the positive terminal of the load 42 to provide the discharge of the battery pack 32. A start switch 44 is provided to begin the discharging process when desired. Thus, when the switch 44 is closed, the battery pack 32 is discharged to the referenced voltage by current flow through the load 42 at some rate depending on the electrical configuration of the circuit 30 and the size of the load 42. The battery pack 32 will discharge to the reference voltage and will float at that voltage once it is discharged.

Figure 3:
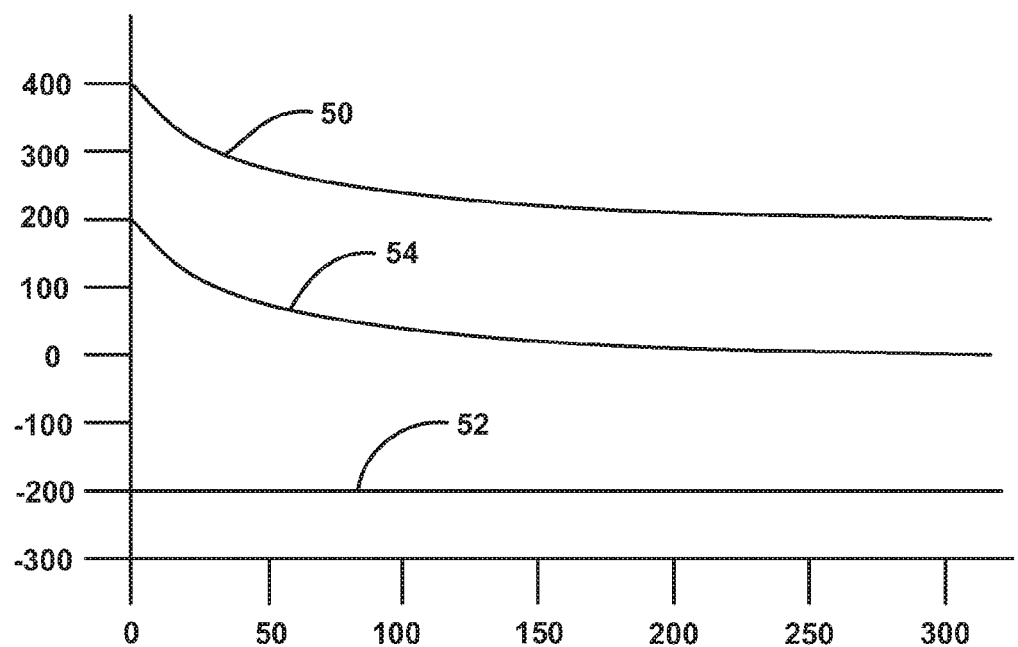
FIG. 3 is a graph with time on the horizontal axis and voltage on the vertical axis showing the voltage discharge of a battery for the auto-discharge circuit shown in FIG. 2.

FIG. 3 is a graph with time on the horizontal axis and voltage on the vertical axis showing discharging of the battery pack 32 using the circuit 30. Graph line 50 represents the voltage potential of the battery pack 32, graph line 52 represents the reference voltage potential, being negative because the negative terminal of the source 40 is electrically coupled to the negative terminal 38 of the battery pack 32, and graph line 54 represents the voltage potential across the load 42. In this non-limiting example, the voltage of the battery pack 32 is 400 volts before it is discharged and the reference voltage is 200 volts, which provides a 200 volt potential across the load 42. When the switch 44 is closed at time equal zero, the battery pack 32 exponentially discharges to the voltage potential of the load 42 in about 300 milliseconds and is held at the voltage potential by the reference voltage of the source 40. Because there is no potential across the load 42 when the battery pack voltage and the referenced voltage are the same, there is no discharge current from the battery pack 32 once it reaches the potential of the voltage source 40. This is shown by the graph in FIG. 4 where from time zero, the battery pack 32 exponentially discharges to zero amps in about 300 milliseconds.

As mentioned above, the series configuration of the circuit 30 discharges the battery pack 32 to the reference voltage using the example values in about 300 milliseconds. This is a relatively long discharge time, which occurs because of the relatively low voltage potential across the load 42 during the discharge. That discharge time can be increased by increasing the voltage potential across the load 42, i.e., greater current flow through the load 42, which requires a larger load device. In order to provide a quicker discharge rate at a lower reference voltage, a parallel configured discharge circuit can be employed.

Figure 5:
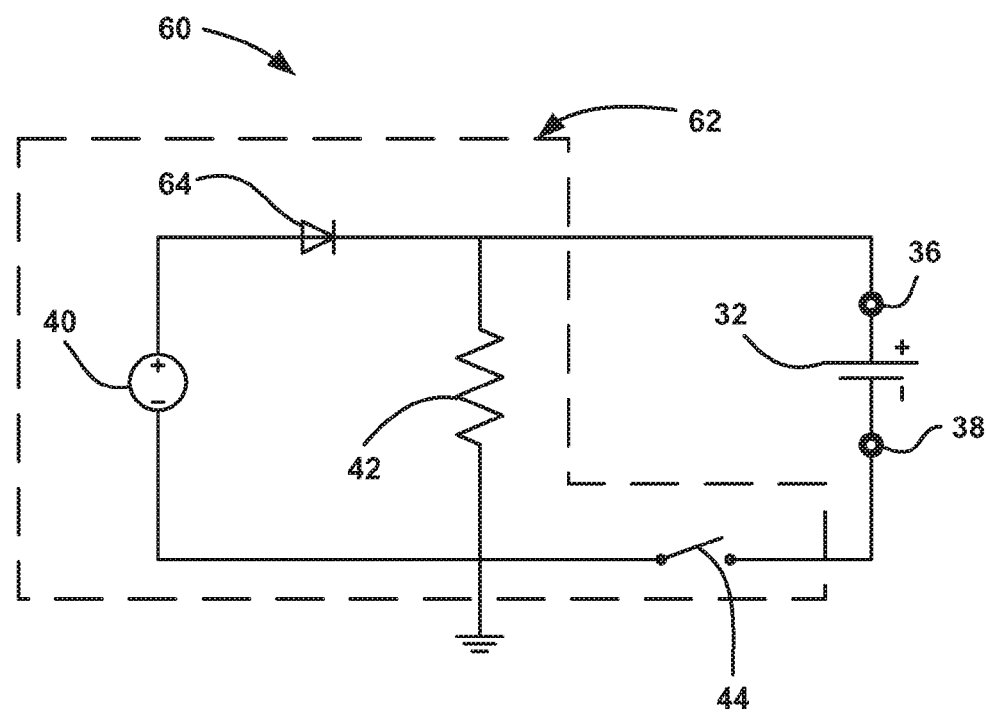
FIG. 5 is a schematic diagram of a parallel configured externally referenced scalable auto-discharge circuit.

FIG. 5 is a schematic diagram of an externally referenced scalable auto-discharge circuit 60, including a discharge unit 62, for discharging the battery pack 32, where the circuit elements common between the circuits 60 and 30 are identified by the same reference number. In this electrical configuration, the load 42 is electrically coupled in parallel with the battery pack 32 and as such has the same voltage potential as the battery pack 32. Because the load 42 has the same voltage potential as the battery pack 32, the current flow through the load 42 is higher than if the load 42 is electrically coupled in series with the battery pack 32 as in the circuit 30. Particularly, in the series configuration of the circuit 30, the difference between the referenced voltage and the battery voltage was applied across the load 42. In the parallel configuration of the circuit 60, the full voltage of the battery pack 32 is applied across the load 42.

As discussed above, because the load 42 receives a greater current flow, it is a larger device, which adds cost to the device, but provides the advantage of faster voltage dissipation. Also, the more power dissipated by the load 42, the higher the heat sinking requirements. Further, because the voltage source 40 in the parallel configuration of the circuit 60 does not conduct current as the voltage source 40 does in the series configuration of the circuit 30, the source 40 can be very small in the circuit 60. In the parallel circuit 60, as long as the potential across the source 40 is lower than the potential across the battery pack 32, the voltage of the battery pack 32 will automatically discharge to the reference voltage. The circuit 60 includes a diode 64 between the DC source 40 and the load 42 to prevent current flow into the positive terminal of the source 40.

Figure 6:
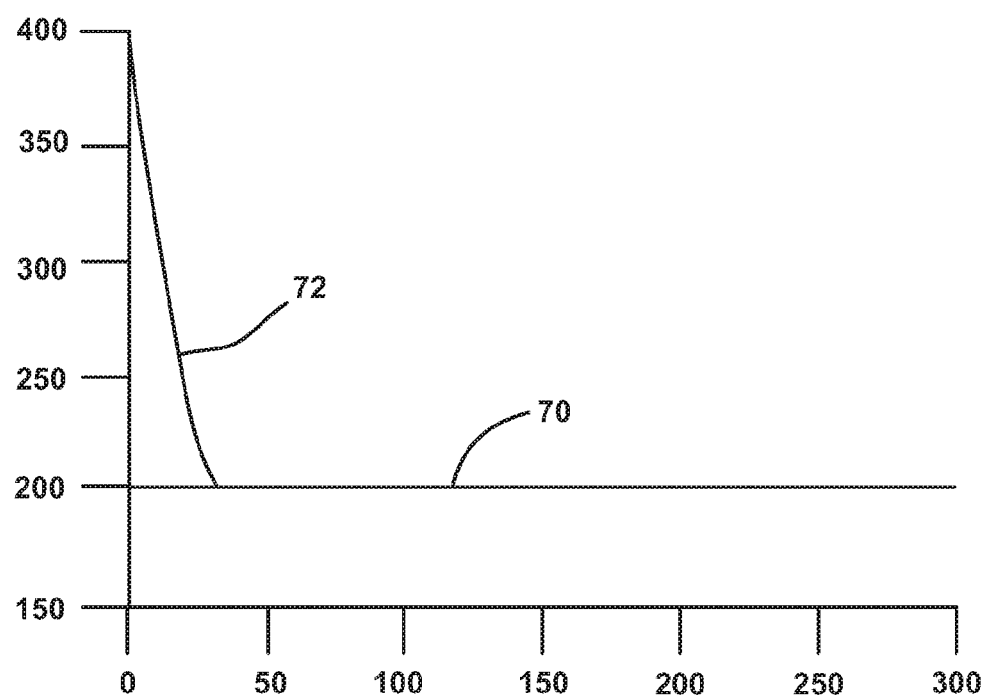
FIG. 6 is a graph with time on the horizontal axis and voltage on the vertical axis showing the voltage discharge of a battery for the auto-discharge circuit shown in FIG. 5.
Figure 7:
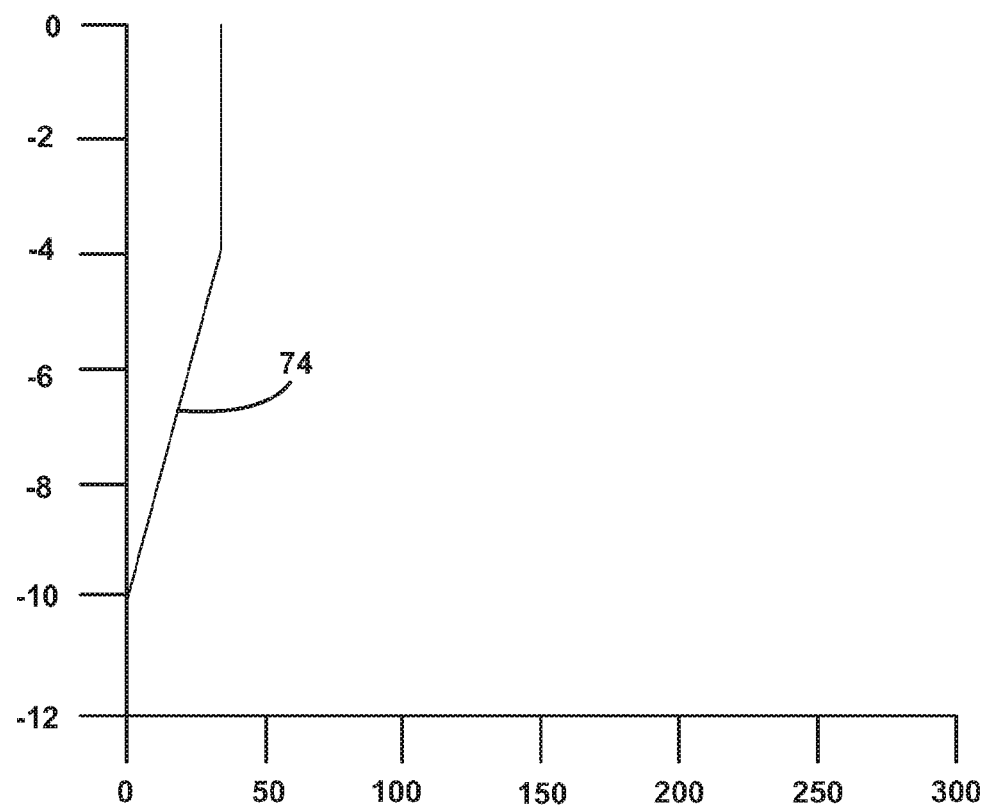
FIG. 7 is a graph with time on the horizontal axis and current on the vertical axis showing the current discharge of a battery for the auto-discharge circuit shown in FIG. 5.

Thus, using the same reference voltage and the same starting voltage of the battery pack 32, the battery pack 32 will discharge to the reference potential provided by the source 40 much quicker in the parallel configuration because of the higher current flow through the load 42. This is illustrated by the graphs shown in FIGS. 6 and 7, which are similar to the graphs shown in FIGS. 3 and 4. In the graph of FIG. 6, the reference potential is shown as a positive 200 volts by graph line 70 and both the voltage potentials across the battery pack 32 and the load 42 are shown by graph line 72. As shown, the discharge from 400 volts to 200 volts linearly occurs in about 25 milliseconds. In the graph of FIG. 7, the current through the load 42 is shown by graph line 74 and is shown linearly dissipating from 10 amps to zero in about 25 milliseconds.

Figure 8:
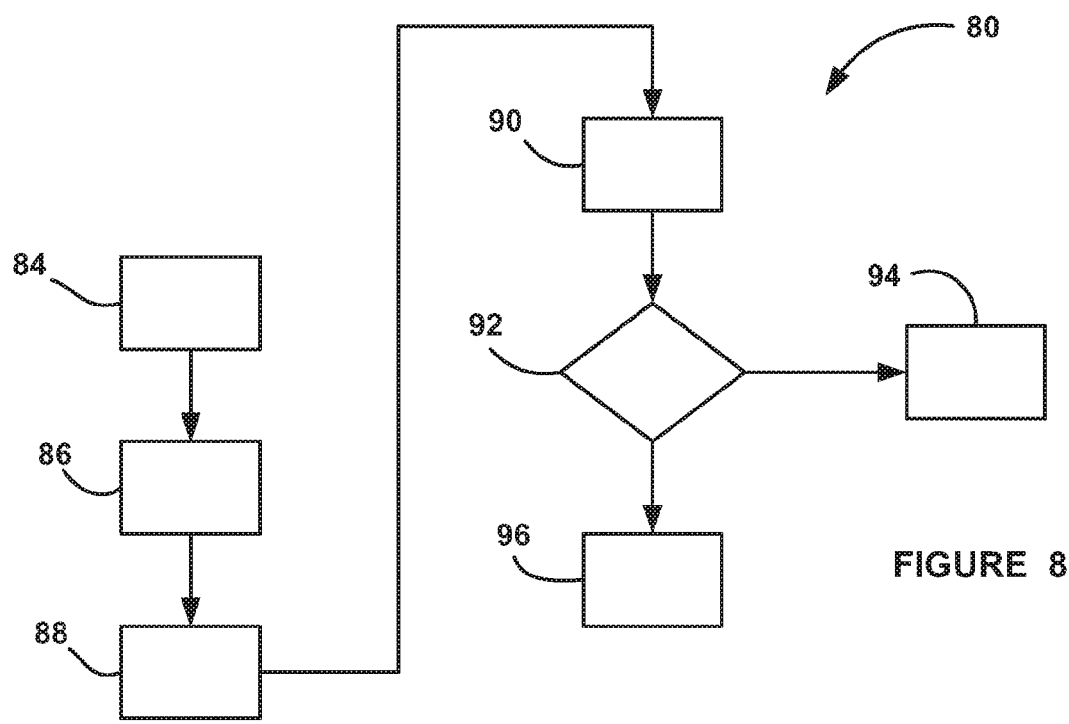
FIG. 8 is a flow chart diagram showing a process for discharging a vehicle battery using either of the auto-discharge circuits shown in FIGS. 2 and 5.

FIG. 8 is a flow chart diagram 80 showing the general process for operating the circuits 30 and 60 described above. At box 84, the operator will connect the unit 34 or 62 to the battery pack 32. At box 86, the operator will determine the desired voltage that the battery pack 32 should be discharged to. This can be determined based on various parameters, such as battery pack type, battery pack size, etc. At box 88, the operator sets the voltage source 40 to the desired discharge voltage of the battery pack 32 and then closes the switch 44 at box 90. The control algorithm that controls the circuit 30 or 60 monitors the terminal voltage of the battery pack 32 and the desired discharge voltage at decision diamond 92, and once the terminal voltage reaches the discharge voltage, the discharge is complete at box 94, where the unit 34 or 62 can be disconnected from the battery pack 32. Otherwise, the discharge process continues at box 96.

The circuits 30 and 60 described above are circuits that provide an external reference voltage by the voltage source 40 in the units 34 and 62. In other embodiments, it may be desirable to provide the reference voltage internal to the vehicle, particularly, use the battery pack 32 itself as the reference voltage to which the battery pack 32 is discharged to. This can be accomplished by providing a voltage divider circuit in electrical parallel with the battery pack 32.

Figure 9:
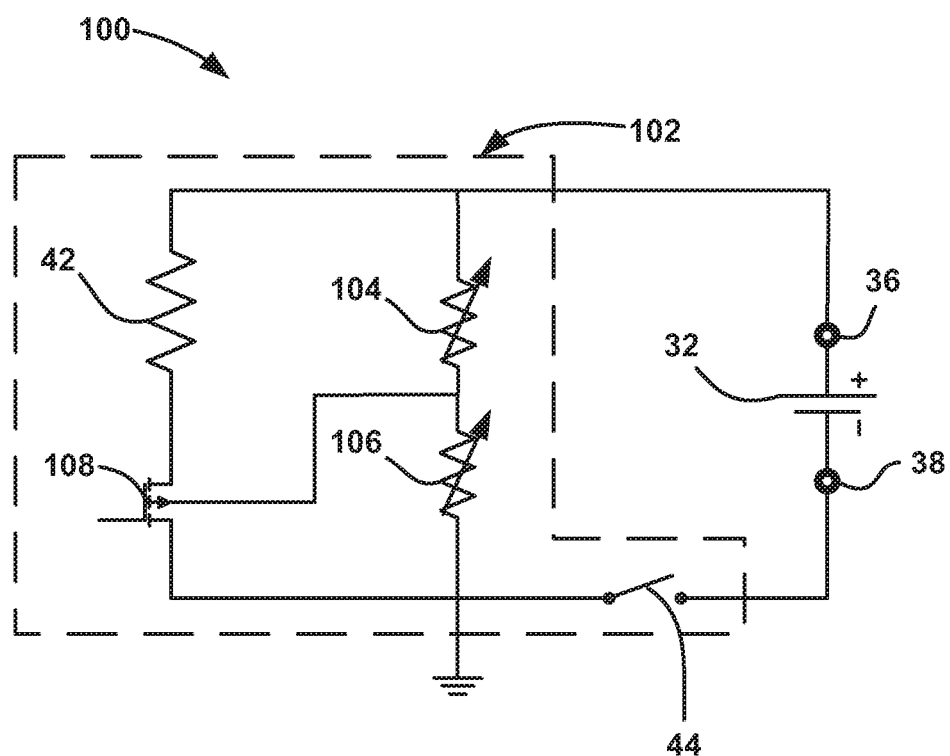
FIG. 9 is a schematic diagram of an internally referenced scalable auto-discharge circuit that employs a soft-switch architecture.

FIG. 9 is a schematic diagram of an internally referenced scalable auto-discharge circuit 100 including a discharge unit 102 that may be portable and employs a soft-switch architecture, where like elements to the circuits 30 and 60 are identified by the same reference number. As mentioned, in the circuit 100, the battery pack 32 provides the reference voltage to which the battery pack 32 is discharged to. Particularly, a voltage divider network including resistors 104 and 106 electrically coupled across the battery pack 32 and provided within the discharge unit 102 divides the voltage of the battery pack 32 to provide the reference voltage. The load 42 is electrically coupled in parallel with the voltage divider network and the battery pack 32. One or both of the resistors 104 and 106 can be made variable so that control of the resistances of the resistors 104 and 106 can selectively set the reference voltage, consistent with the discussion herein.

A semiconductor switch 108, such as a MOSFET, IBGT, etc., provides the soft-switch architecture, discussed in more detail below. The voltage potential across the resistor 106 provides the reference potential that controls the gate terminal of the switch 108 to cause the switch 108 to turn on at relatively low current levels when a high enough voltage is applied. The values of the resistors 104 and 106 are suitably selected so that they have a high impedance, which prevents a large current flow through the resistors 104 and 106. The resistance of the resistor 106 is selected relative to the resistor 104 so that as the voltage of the battery pack 32 decreases during the discharge, the reference voltage decreases. As the reference voltage decreases, the voltage applied to the gate terminal of the switch 108 decreases, where eventually the voltage will reach a threshold voltage of the switch 108, which causes it to turn off. The electrical configuration of the circuit 100 is such that when the battery pack 32 discharges and the switch 108 eventually opens, which sets the voltage of the battery pack 32 to the voltage when the reference potential is when the switch 108 opens, a rebound voltage will occur in the battery pack 32 causing its voltage to increase, which will cause the switch 108 to open. The switch 108 may cycle on and off many times at the end of the discharge process until eventually the power in the system is dissipated far enough where the switch 108 will remain open.

Figure 10:
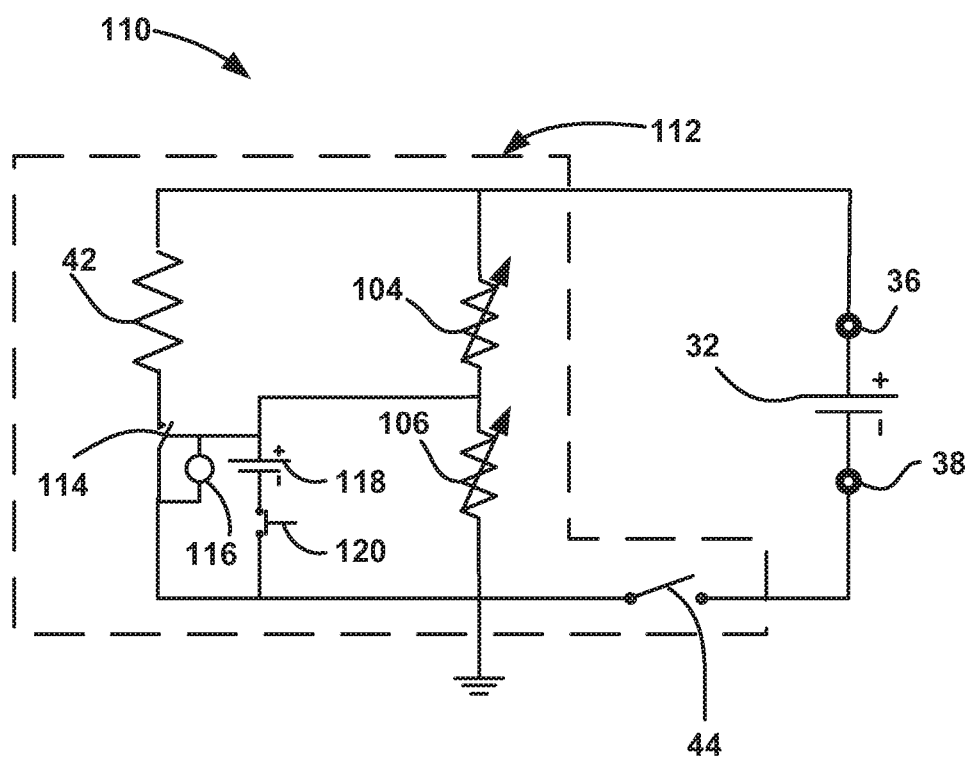
FIG. 10 is a schematic diagram of an internally referenced scalable auto-discharge circuit that employs a hard-switch architecture.

FIG. 10 is schematic diagram of an internally referenced scalable auto-discharge circuit 110 similar to the circuit 100, including a discharge unit 112, where like elements are identified by the same reference numeral. In the circuit 110, the soft-switch 108 is replaced with a mechanical relay-type switch 114 including a spring (not shown) and a coil 116 providing a hard-switch architecture, where the spring holds the switch 114 open. When the switch 44 is closed and the discharging operation begins, where the voltage potential of the battery pack 32 is high at its normal potential, the divided voltage across the resistor 106 provides a current flow through the coil 116 that acts against the spring force. However, the reference voltage is initially not enough to overcome the spring force, and thus, when the discharge sequence is started, additional power from a supplemental power source 118 is provided to the coil 116 by closing a push button switch 120. When the switch 120 is pressed, the combination of the current flow from the source 118 and the current flow from the reference voltage through the coil 116 closes the switch 114, where removing pressure from the push button 120 returns it to its open position disconnecting the power source 118. Once the switch 114 is closed, the reference voltage is high enough to maintain the switch 114 in the closed position until the battery pack 32 discharges to the desired level.

As the battery pack 32 discharges as the current flows through the load 42, eventually the reference voltage provided by the resistor 106 will be reduced where it will not be enough to overcome the spring force. Once this voltage level has been reached, the switch 114 opens, which causes the battery pack 32 to be discharged to the desired voltage. In this embodiment, a rebound voltage may occur when the switch 114 is opened, but it will not be enough to overcome the spring force in the switch 114 to cause it to close.

Figure 4:
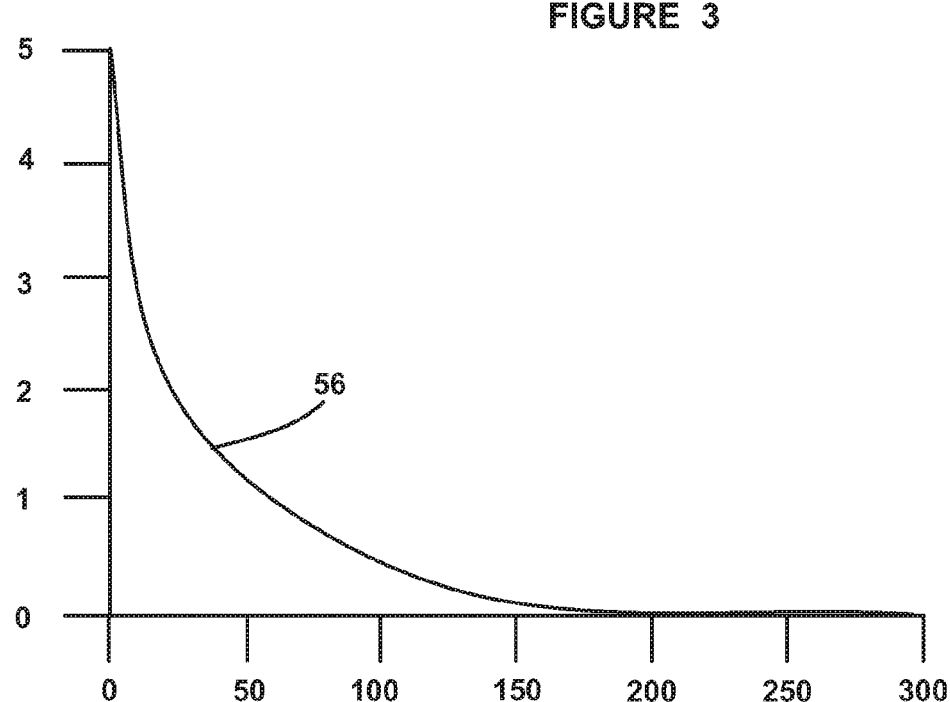
FIG. 4 is a graph with time on the horizontal axis and current on the vertical axis showing the current discharge of a battery for the auto-discharge circuit shown in FIG. 2.
Figure 11:
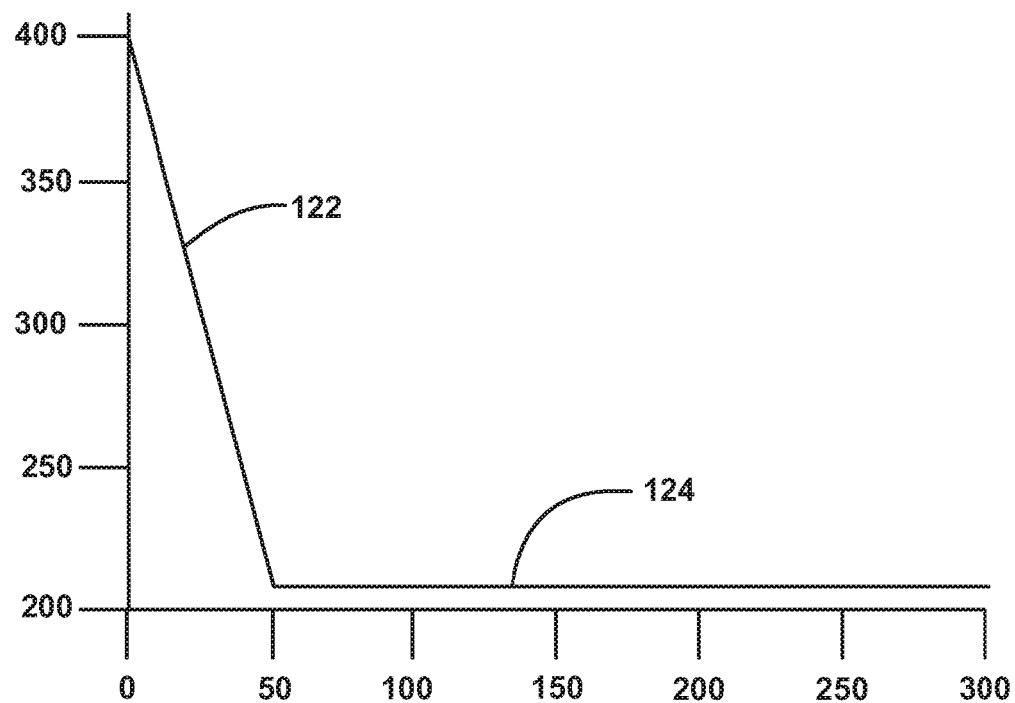
FIG. 11 is a graph with time on the horizontal axis and voltage on the vertical axis showing the discharge voltage of a battery for either of the auto-discharge circuits shown in FIGS. 9 and 10.
Figure 12:
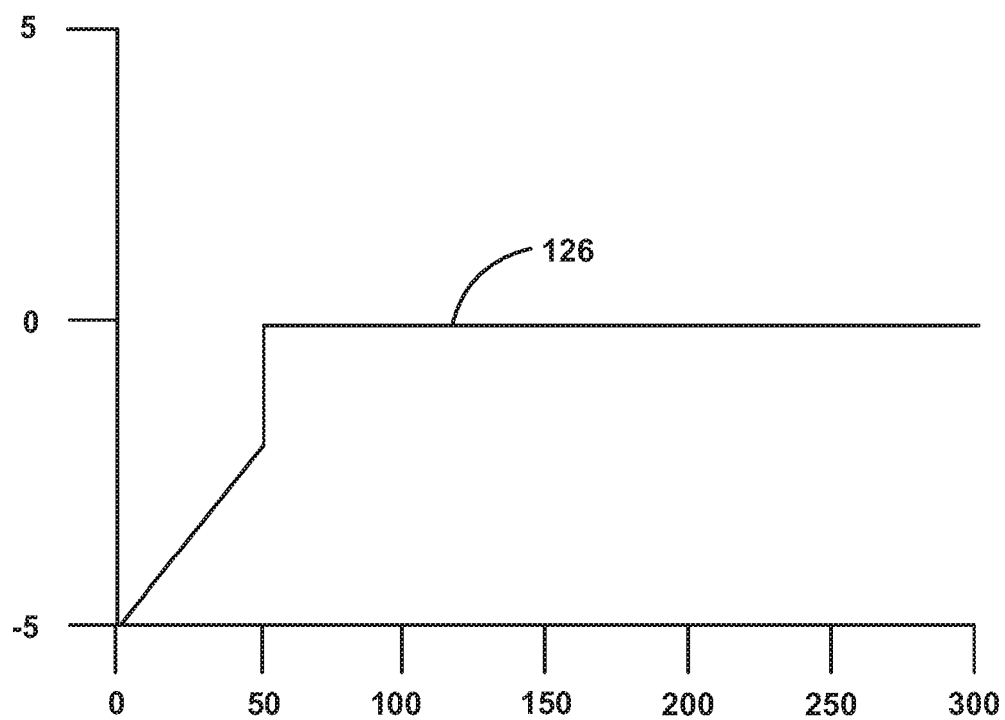
FIG. 12 is a graph with time on the horizontal axis and current on the vertical axis showing the current discharge of a battery for either of the auto-discharge circuits shown in FIGS. 9 and 10.

FIG. 11 is a graph similar to the graphs in FIGS. 3 and 6 and showing both the voltage across the battery pack 32 and the voltage across the load 42 at graph line 122, where the voltage linearly dissipates from 400 volts down to just above the referenced potential of 200 volts at graph line 124 in about 50 milliseconds. Likewise, FIG. 12 is a graph similar to the graphs in FIGS. 4 and 7 showing the current dissipation on graph line 126 for the circuits 100 and 110, where the current flow through the load 42 dissipates from −5 amps to zero in about 50 milliseconds.

Figure 13:
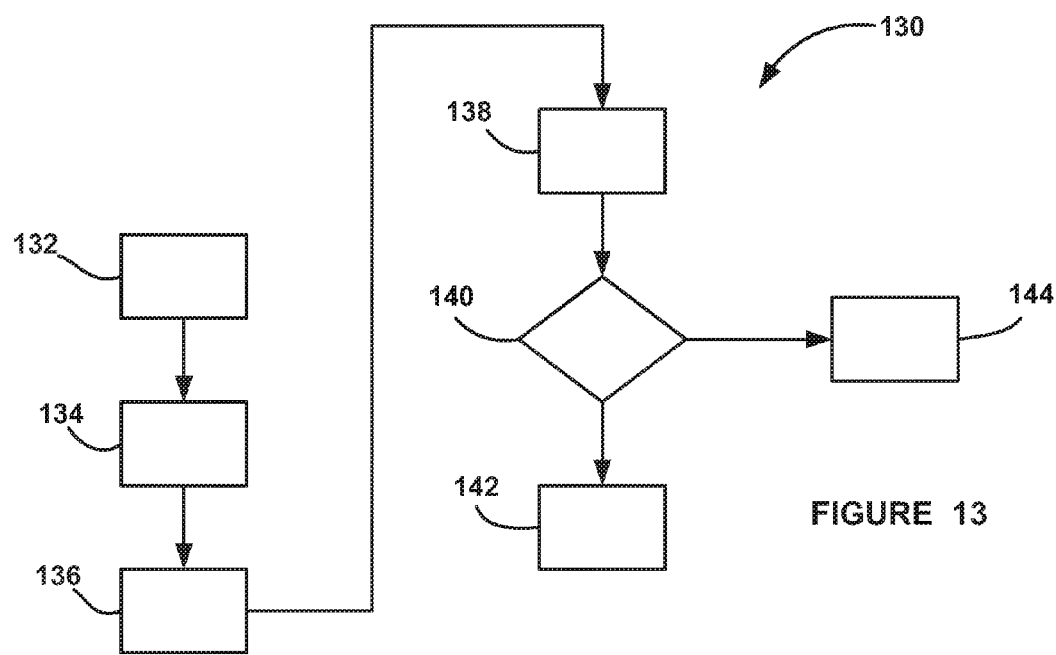
FIG. 13 is a flow chart diagram showing a process for discharging a vehicle battery using the auto-discharge circuit shown in FIG. 9.

FIG. 13 is a flow chart diagram 130 showing a process for discharging the battery pack 32 using the circuit 100. At box 132, the operator will connect the unit 102 to the battery pack 32. At box 134, the operator will determine the desired voltage that the battery pack 32 should be discharged to. This can be determined based on various parameters, such as battery pack type, battery pack size, etc. At box 136, the operator sets the resistance values of the resistors 104 and 106 to provide the desired discharge voltage of the battery pack 32 and then closes the switch 44 at box 90 to begin the discharge process. The control algorithm that controls the circuit 100 monitors the terminal voltage of the battery pack 32, and once the terminal voltage reaches the discharge voltage, the discharge is complete at box 144, where the unit 102 can be disconnected from the battery pack 32. Otherwise, the discharge process continues at box 142.

Figure 14:
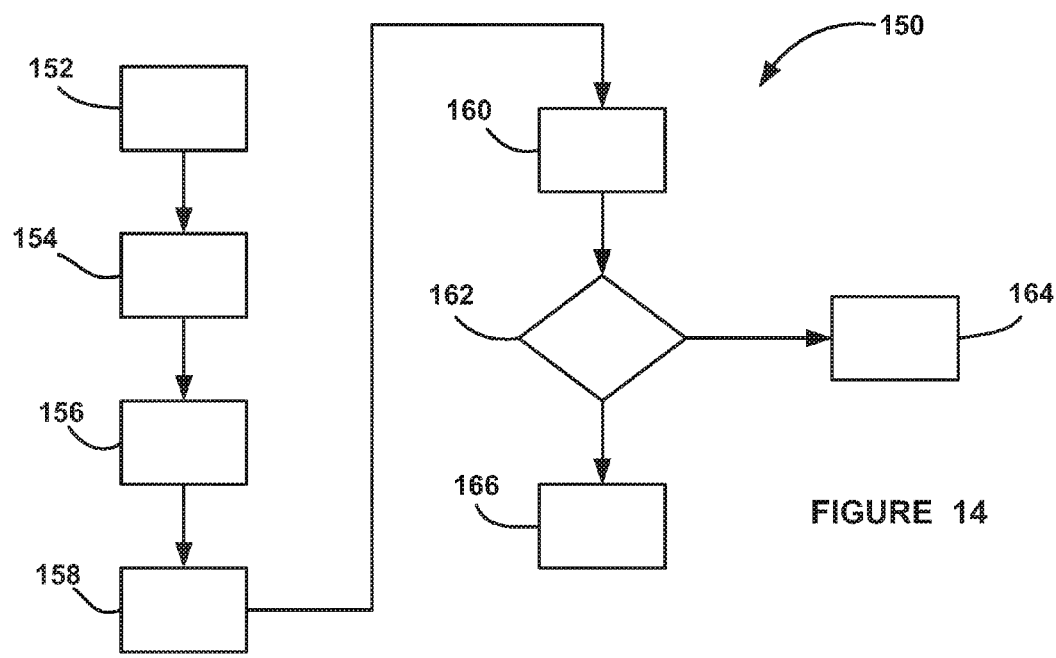
FIG. 14 is a flow chart diagram showing a process for discharging a vehicle battery using the auto-discharge circuit shown in FIG. 10.

FIG. 14 is a flow chart diagram 150 showing a process for discharging the battery pack 32 using the circuit 110. At box 152, the operator will connect the unit 112 to the battery pack 32. At box 154, the operator will determine the desired voltage that the battery pack 32 should be discharged to. This can be determined based on various parameters, such as battery pack type, battery pack size, etc. At box 156, the operator sets the resistance values of the resistors 104 and 106 to provide the desired discharge voltage of the battery pack 32 and then closes the switch 44 at box 90 to begin the discharge process. Also, the operator presses the push button 120 at box 158. The control algorithm that controls the circuit 110 monitors the terminal voltage of the battery pack 32, and once the terminal voltage reaches the discharge voltage, the discharge is complete at box 160, where the unit 112 can be disconnected from the battery pack 32. Otherwise, the discharge process continues at box 162.

As will be well understood by those skilled in the art, the several and various steps and processes discussed herein to describe the invention may be referring to operations performed by a computer, a processor, or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A discharge circuit for discharging a battery, said battery including a positive terminal and a negative terminal, said circuit comprising:
   a reference voltage source providing a reference voltage, said voltage source including a negative terminal and a positive terminal, said voltage source being electrically coupled in parallel with the battery where the negative terminal of the voltage source is electrically coupled to the negative terminal of the battery;
   a load electrically coupled in parallel with the battery and the voltage source, wherein a current flow through the load generated by the battery discharges the battery to the reference voltage;
   a diode electrically coupled between the voltage source and the battery and preventing current flow from the battery from entering the voltage source; and
   a switch, said switch being closed to begin the discharging of the battery;
   wherein a first terminal of the switch is directly connected to a negative terminal of the battery.

2. The circuit according to claim 1 wherein the voltage source is a variable voltage source so that the reference voltage can be changed.

3. The circuit according to claim 1 wherein the voltage source and the load are part of a portable unit that can be selectively coupled to the battery.

4. The circuit according to claim 1 wherein the load is one or more resistors.

5. The circuit according to claim 1 wherein the battery is a high voltage battery having a voltage of 400 volts or more.

6. The circuit according to claim 1 where the battery is a vehicle battery.

7. A discharge circuit for discharging a battery on a vehicle, said battery including a positive terminal and a negative terminal, said circuit comprising:
   a reference voltage source providing a reference voltage, said voltage source including a negative terminal and a positive terminal, said voltage source being electrically coupled in parallel with the battery where the negative terminal of the voltage source is electrically coupled to the negative terminal of the battery;
   a load electrically coupled in parallel with the battery and the voltage source, wherein a current flow through the load generated by the battery discharges the battery to the reference voltage; and
   a switch, said switch being closed to begin the discharging of the battery;
   wherein a first terminal of the switch is directly connected to a negative terminal of the battery.

8. The circuit according to claim 7 wherein the voltage source and the load are part of a portable unit that can be selectively coupled to the battery.

9. The circuit according to claim 7 further comprising a switch, said switch being closed to begin the discharging of the battery.

10. The circuit according to claim 7 wherein the load is one or more resistors.

11. The circuit according to claim 7 further comprising a diode electrically coupled between the voltage source and the battery and preventing current flow from the battery from entering the voltage source.

12. The circuit according to claim 7 wherein the battery is a high voltage battery having a voltage of 400 volts or more.

13. A discharging circuit for use with a battery having a battery positive terminal and a battery negative terminal, the discharging circuit comprising:
- a load having a first load terminal and second load terminal, the first load terminal being directly connected to the battery positive terminal and the second load terminal being directly connected to ground;
- a switch having a first switch terminal and a second switch terminal, the first switch terminal being directly connected to the battery negative terminal and the second switch terminal being directly connected to the second load terminal and ground;
- a reference voltage source having a positive reference terminal and a negative reference terminal, the negative reference terminal being directly connected to the second load terminal, the second switch terminal, and ground; and
- a diode having a cathode and an anode, the anode being directly connected to the positive reference terminal and the cathode being directly connected to the battery positive terminal and the first load terminal.

* * * * *